(No Model.) 7 Sheets—Sheet 2.

W. WEBBER.
COIN CONTROLLED GAS VENDING MACHINE.

No. 591,515. Patented Oct. 12, 1897.

WITNESSES:

INVENTOR
Wesley Webber
BY
ATTORNEY.

(No Model.) 7 Sheets—Sheet 3.

W. WEBBER.
COIN CONTROLLED GAS VENDING MACHINE.

No. 591,515. Patented Oct. 12, 1897.

WITNESSES:

INVENTOR
Wesley Webber
BY N. Albertus Week
ATTORNEY (No Model.) 7 Sheets—Sheet 4.

W. WEBBER.
COIN CONTROLLED GAS VENDING MACHINE.

No. 591,515. Patented Oct. 12, 1897.

WITNESSES:
Paul Johot
F. M. Frazer.

INVENTOR
Wesley Webber
BY H. Albertus Webb
ATTORNEY

THE NORRIS PETERS CO., PHOTO-LITHO., WASHINGTON, D. C.

(No Model.) 7 Sheets—Sheet 5.

W. WEBBER.
COIN CONTROLLED GAS VENDING MACHINE.

No. 591,515. Patented Oct. 12, 1897.

WITNESSES:
Paul Jahel
F. M. Frazer

INVENTOR
Wesley Webber
BY H. Albertus West
ATTORNEY

THE NORRIS-PETERS CO., PHOTO-LITHO., WASHINGTON, D. C.

(No Model.) 7 Sheets—Sheet 6.

W. WEBBER.
COIN CONTROLLED GAS VENDING MACHINE.

No. 591,515. Patented Oct. 12, 1897.

WITNESSES:
Paul Johel
F. H. Frazer

INVENTOR
Wesley Webber
BY H. Albertus West
ATTORNEY

THE NORRIS PETERS CO., PHOTO-LITHO., WASHINGTON, D. C.

(No Model.) 7 Sheets—Sheet 7.
W. WEBBER.
COIN CONTROLLED GAS VENDING MACHINE.

No. 591,515. Patented Oct. 12, 1897.

WITNESSES:
INVENTOR
Wesley Webber
BY
ATTORNEY

United States Patent Office.

WESLEY WEBBER, OF NEW YORK, N. Y.

COIN-CONTROLLED GAS-VENDING MACHINE.

SPECIFICATION forming part of Letters Patent No. 591,515, dated October 12, 1897.

Application filed March 2, 1897. Serial No. 625,715. (No model.)

*To all whom it may concern:*

Be it known that I, WESLEY WEBBER, a citizen of the United States, and a resident of New York, in the county of New York and State of New York, have invented certain new and useful Improvements in Coin-Controlled Gas-Vending Machines, of which the following is a specification.

The object of my invention is to provide a coin-controlled gas-vending apparatus that shall be capable of attachment to any ordinary ready-made gas-meter, preferably a "dry" meter, without necessitating any change in the construction or arrangement of the same and without throwing any load or strain or wear directly or indirectly upon the worm on the king-post or spindle in the top of an ordinary dry meter, (which, in meters as ordinarily made, having no labor to perform more than driving the "two-foot" shaft and through it the wheels of the meter-index, is of soft metal and therefore liable to cut or grind or wear away if called upon to perform the extra labor of actuating a gas-vending apparatus,) thereby avoiding the necessity of substituting for it a hard-metal worm.

It is also my intention to keep the gas-vending mechanism as far as possible outside of the meter-casing, so that access to the vending mechanism shall not necessitate opening the meter-casing and so that the prepayment mechanism shall not interfere with easy access to the parts of the meter proper if the same should need examination, cleansing, or repair, and for this purpose, as well as for the purpose of adapting the machine, as above stated, to be easily applied bodily to ready-made meters, I plan the gas-vending apparatus and the valve by which it controls the flow of gas through the meter as a separate mechanism complete in itself and entirely exterior to the meter-casing except for the means of transmitting the impulses of the meter-bellows from within the meter-casing to its outside, and plan in doing this to avoid leakage and the necessity of expensive nicety of assembling.

It is also my intention to derive the power to actuate the counting-off or gas-registering and valve-closing part of my gas-vending apparatus not from any part of the mechanism of the meter-index, (and thereby brake or drag the same,) but independently and synchronously from the same ample source of power which actuates the counting or registering mechanism of the meter—that is to say, from the flag-arm or from the flag-rod, which is attached directly to one of the diaphragms or bellows of the meter and which is oscillated to and fro by the alternate inflations and deflations of the meter-bellows with a power equal to the service-pressure of the gas per square inch multiplied by the number of square inches of bellows-surface. Sufficient power to actuate my gas-vending apparatus taken off here does not affect or dim the gas-jets perceptibly, if any, and as the stream of power is tapped before it reaches the said worm which actuates the index mechanism the action of the latter is not affected, but the two counting mechanisms—viz., that of the meter-index and that of my apparatus—count and register the number of oscillations of the flags of the meter independently, but synchronously, neither affecting or interfering with the other, but each tallying exactly with the other at all times and under all circumstances.

It is also my purpose to govern the flow of gas through the meter by means of a reliable turn-cock or rotary plug-valve in the gas-pipe, but outside of the meter, easily accessible to the company's collector for examination and test when he calls to collect the coins, but inaccessible to the consumer, which cock cannot stick or become loose or leaky, but shall be always easily rotatory in its seat and yet always gas-tight, and which shall give a very long period of "dimming" or warning to the consumer, first, by being turned off very gradually by the meter, (which moves more and more slowly as the volume of gas permitted to pass is lessened,) and, secondly, by means of so shaping the aperture in the plug of the cock that in the course of being turned off the width of the aperture may be lessened to a narrow "telltale" channel or slot.

It is also my intention to combine the working parts of the mechanism upon as few shafts as possible and its two pointers (one for coins and one for fractions of a coin's equivalent in gas) clock-hand fashion upon one post and one dial, and to otherwise economize and simplify the construction and arrangement of the parts necessary to perform all the required functions of a coin-controlled gas-vending apparatus, particularly including the prevention of fraud and of accidental clogging, (by introducing a coin when the coin-carrier is not in the proper position to receive it, by introducing two coins in succession without completely operating the coin-carrier after the insertion of the first coin, or by introducing at one time more coins than the machine may have been constructed to receive at one time,) and also to so arrange my reducing-gears that at each step of the reduction they may be easily replaced by gears of a different number of teeth, so that both fundamental and detail changes in the price of gas may be adjusted for.

In the accompanying drawings, to which reference is made and which form a part of the specification.

In the drawings, 2 represents the casing of the coin-controlled machine, which is adapted to be secured to the meter-casing 3 by means of a bracket 4 (shown in Fig. 1) or by any other appropriate means. A skeleton plate 5 is held rigidly in this casing by a suitable number of pillars 6 6, secured to the back plate 7 of the casing. The said skeleton plate is formed with a central opening 8 to receive the dial-plate 9, as shown clearly in Figs. 1 and 9, and said skeleton plate is also formed with an aperture 10, in which the front end of the coin-carrier 12 is journaled, and an aperture 13, in which is journaled the front end of the shaft 14, which carries the reducing-wheel 15. (See Figs. 1 and 2.)

Figure 1:
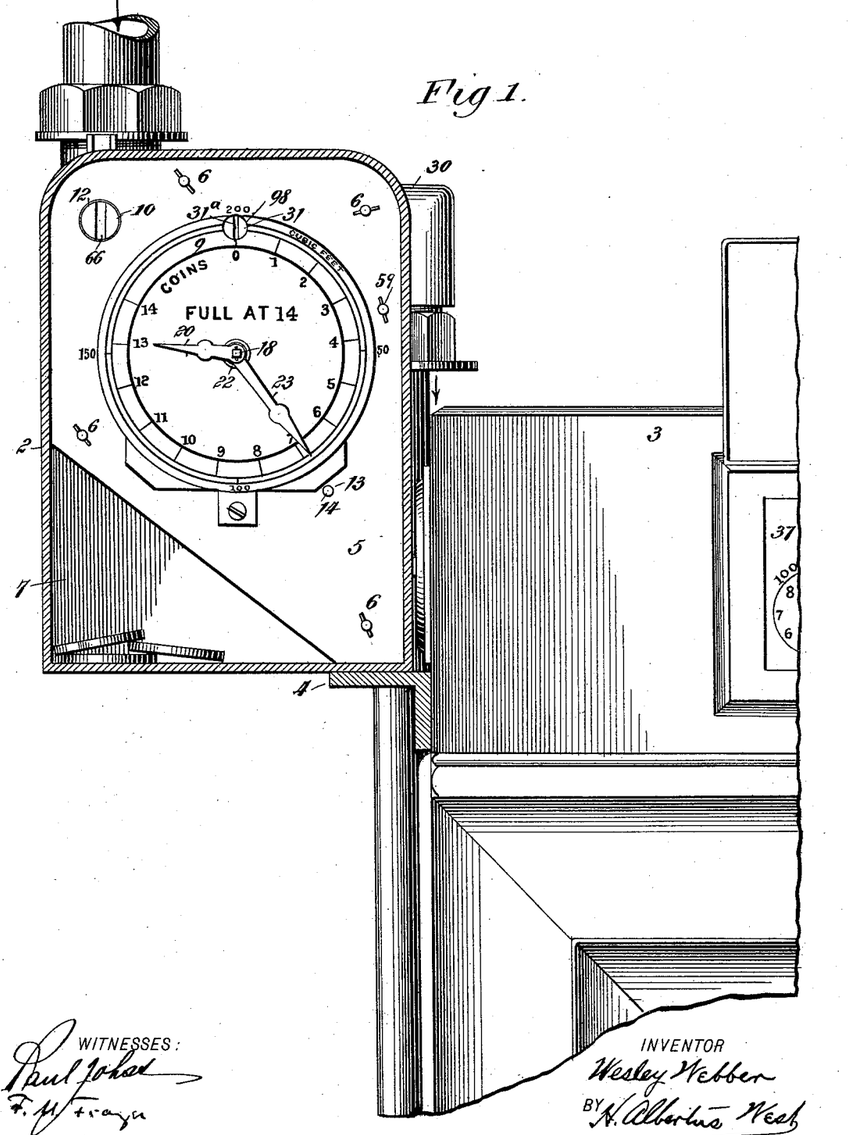
Figure 1 shows in front elevation a portion of an ordinary meter having my new coin-controlled gas-vending machine applied thereto, the latter being shown in sectional elevation, the section being taken on line $x\ x$ of Fig. 9.

Upon the short pillars 16 16 is secured an intermediate bridge or plate 17, in which and in the back plate is journaled the main shaft 18, on which is secured the toothed escapement rack or wheel 19 and which is provided in front of the dial-plate with a hand or pointer 20 to indicate from time to time on the dial the number of coins, if any, representing as many equivalents thereof in gas paid for, but as yet unconsumed and standing to the consumer's credit. The said shaft 18 also serves as an axle for the coin's-equivalent or units or metric wheel 21 and its sleeve or arbor 22, which latter carries in front of the dial 9 a hand or pointer 23 for indicating on the dial the progressive consumption of each successive coin's equivalent in gas. For example, the hands or pointers in Fig. 1 represent that the consumer has thirteen full coins' equivalents in gas to his credit as paid for, but unconsumed, and that between fifty and one hundred feet of gas of the fourteenth coin's worth has been consumed. The pointer 23 rotates gradually in only one direction—that of a clock-hand— while pointer 20 jumps ahead one figure for each coin inserted and back one figure for each coin's equivalent in gas consumed. When both hands are at zero—i. e., in the twelve-o'clock position—the valve is closed and nothing stands to the consumer's credit.
On the said main shaft 18 is placed a spring 24, here shown as a spiral spring, (though a coiled spring or a weight and cord or a weighted radial arm may be employed, if preferred,) which constantly tends to urge the escapement-rack in the direction of the arrow, Fig. 5, and on the same shaft is secured, preferably adjacent to the escapement-rack, a cam 25, which, as hereinafter described, serves to hold the pivoted link or pendant 26 out of range of the valve-closing stud 27 as it rotates with the coin's-equivalent wheel 21 and to allow said pendant to fall into said stud's path of rotation at the proper time.

28 represents the gas cock or valve, fitted to turn in the seat 29 in the coupling or union 30, connecting the meter to the main or to the service-pipe, the arrows representing the course of the gas. The valve-stem 31 reaches through the back plate 7 of the casing and is journaled in the bridge 17. It is provided with an arm or crank 32, to which the said link or pendant 26 is loosely pivoted.

33 represents a lever, (fulcrumed at 33ᵃ in the bridge 17,) one end of which is to be operated or depressed by the act of inserting a coin, the opposite end serving to open the gas-cock by impinging against the arm or crank 32 or a stud 32ᵃ thereon. Normally the said lever 33 will rest in the position shown in Figs. 2, 5, and 7, but during the insertion of the coin it will be turned to the position shown in Fig. 6, so that it will operate to lift the arm, crank, or lever 32 and the link or pendant 26 from the position shown in Figs. 7 and 14 to that shown in Figs. 2, 5, and 6, the former indicating the valve closed, the latter the valve open. Besides turning on the gas, as just stated, the lever 33 serves also to swing the pendant 26 out of engagement with the valve-closing stud 27 and thus at the outset of its movement to disconnect the valve from the mechanism for closing the valve, the operation of which will be hereinafter described. This function of disconnecting the valve from the valve-closing mechanism is effected in this instance by an arm 34, which is in effect an extension of the lever 33.

Figure 6:
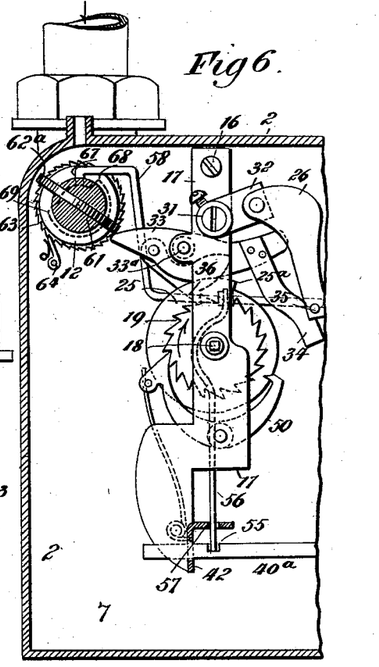
Fig. 6 is a detail view of the mechanism, showing the parts in the position they assume while a coin's equivalent in gas is being purchased and showing the meter locked.
Figure 7:
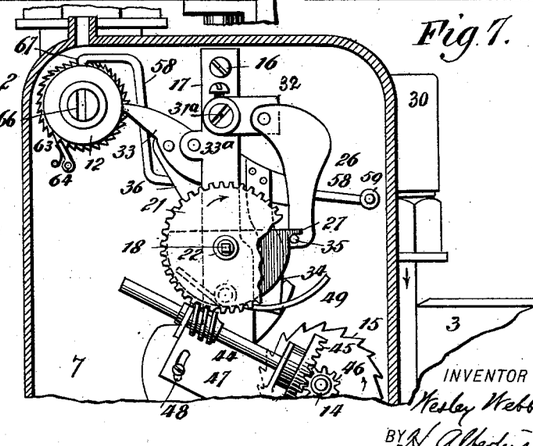
Fig. 7 is a detail view showing the coin's-equivalent wheel in position, the parts being in the position they assume when the gas is automatically cut off.
Figure 9:
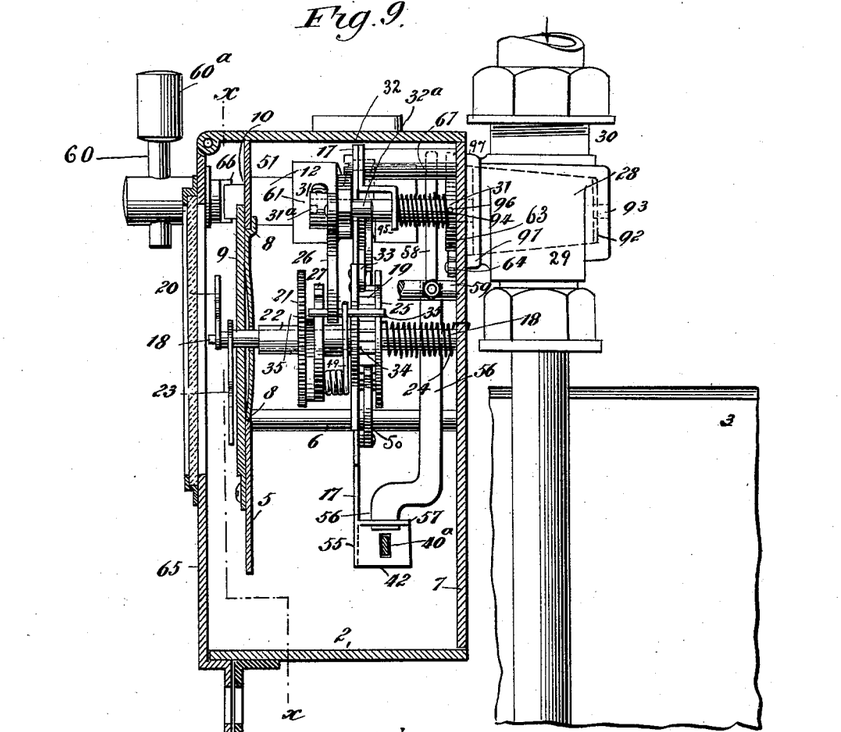
Fig. 9 is a transverse sectional elevation of the coin-controlled machine, showing the parts in the position shown in Fig. 2, the reducing (or first-motion) wheel and the gear connecting it with the coin's-equivalent wheel being omitted, and showing the inlet-pipe of the meter and its connection with the valve-chamber, the front portion of the meter being broken away.
Figures 14, 15:
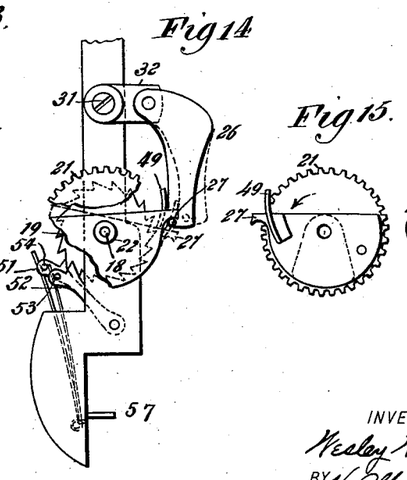
Fig. 14 shows the coin's-equivalent wheel in the two positions it successively assumes when it disengages the valve from the valve-closing mechanism.
Figs. 15 and 16 are respectively rear and side views of the coin's-equivalent wheel and its modified or cam-flange form of trip.
Figure 16:
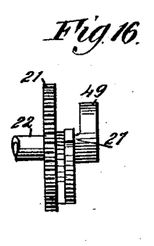

This arm, as here shown, is adapted to swing approximately to the position shown in Fig. 6, in doing which it swings outwardly the pendant 26 and thus disconnects the valve from the valve-closing mechanism and leaves the coin's-equivalent wheel 21 free to rotate and at the end of its last rotation to again engage with and close the valve. In case the machine is constructed to receive more than a single coin at any one time the valve will remain disconnected from the valve-closing mechanism until the equivalent in gas of the last coin is nearly exhausted, whereupon the gas is gradually turned off by the action of the stud 27. In case the machine is constructed to receive but a single coin this prolonged disconnection of the valve from the valve-closing mechanism will of course be dispensed with. A cheap means for this purpose consists in the employment of the said pendant 26 and in providing the same at or near its free end with a cross piece or pin 35, which projects from each face of the pendant, as shown in Figs. 9 and 12, its front end (that to the left in Figs. 9 and 12) serving to be engaged by or to engage with the stud 27, as illustrated in Figs. 7, 11, and 14, and its rear end (that to the right in Fig. 9) serving to rest against such portion of the above-mentioned cam 25 as lies a greater radial distance from the shaft 18 than does the valve-closing stud 27.

Figure 2:
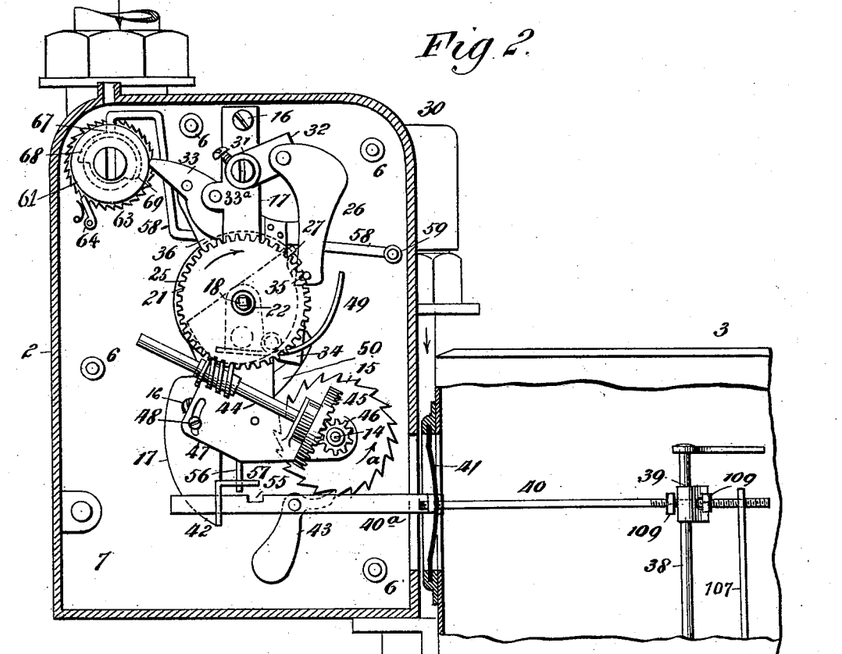
Fig. 2 is a sectional elevation of the apparatus with the skeleton plate, dial-plate, and pointers removed, the parts of the coin-controlled apparatus being shown in the position they assume during the latter portion of the delivery of the last coin's equivalent in gas, but before the beginning of the turning down of the gas, and showing also in sectional elevation a portion of the meter-casing and the preferred means of connecting the coin-controlled machine to the meter mechanism.
Figure 11:
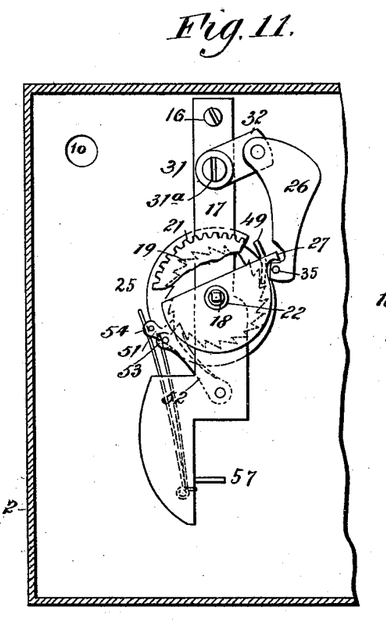
Fig. 11 is a detailed view of the immediate mechanism for turning off the gas, showing a modified form of escapement and showing the coin's-equivalent wheel in the position it assumes just prior to closing the valve.
Figure 12:
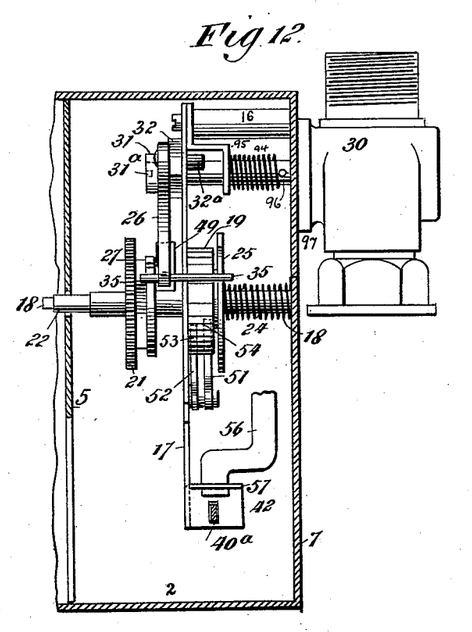
Fig. 12 is a transverse elevation of the same.

When the reduced eccentricity of the cam 25 is presented to the rearwardly-extending end of the pin 35, the front end of the pin is permitted to swing into the path of the valve-closing stud, as shown in Figs. 2 and 11. It will be understood that the said reduced eccentricity will terminate at the toe 25ᵃ of the cam 25 (see Fig. 6) and that the cam is so placed on the shaft 18 that the presentation of its least eccentricity to the pin 35 corresponds with the position of both hands or pointers at zero on the dial and with the closed position of the valve, and also that with the insertion of the first coin and the consequent setting back or winding up of the rack 19 the toe 25ᵃ of the cam will be advanced to the right and passed under the pin 35 while the pin is held away by the arm 34, so that when 34 and 26 fall again to their normal position the pin will rest upon the greater eccentricity of the cam and out of the path of rotation of 27 till the escapement-rack 19 has been released and the cam carried with it.

Figure 8:
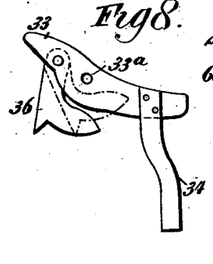
Fig. 8 is a detail front view of the coin-lever and the rack-actuating pawl.

The setting back or winding up of the rack 19, it will be seen, is a coincident operation with the insertion of a coin and (in the special case of a first coin) with the opening of the valve. This function is accomplished in this instance by a rack-actuating pawl 36, pivoted to the lever 33 between its fulcrum 33ᵃ and its coin-depressed end, as shown clearly in Figs. 5 to 8. The preferred construction of this pawl is illustrated in the said figures. Normally it hangs in the position shown in Fig. 5 and in full lines in Fig. 8 free of the teeth of the rack 19 and permits the rack to return freely in the direction of the arrow. When the lever 33 is depressed by the action of a coin in the carrier, the pawl assumes the position shown in Fig. 6 and in dotted lines in Fig. 8 and engages with one of the teeth of rack 19, and as 33 is still further depressed causes the rack to rotate in the direction of the arrow in Fig. 6 the space of one tooth under the spring-pressed yielding escapement-pallet shown in Figs. 5 and 6 or under the two spring-presssed yielding escapement-pawls shown in Figs. 11 to 14, which escapement pallet or pawls, as the case may be, hold the rack against return till they are properly tripped, as hereinafter described. As the edge of the rotated coin passes and clears the end of the lever 33 and its heavier end 34 raises it to its original position pawl 36 swings out of engagement with and clears the teeth of the rack 19 and returns to its normal position. Thus for every depression of the lever 33 the pawl 36 sets back or winds up the rack 19 the space of one tooth.

I do not limit myself to any special form of construction of the coin-carrier more than that in the act of inserting the coin the lever 33 or its equivalent shall be duly operated once, and I shall hereinafter describe three suggested forms; nor do I limit myself to any special means of applying the power of the meter mechanism for operating the vending mechanism; but the preferred means of performing the latter function is illustrated clearly in Fig. 2 and a modification thereof in Fig. 23, the special object being to accurately synchronize the registration of consumption as indicated on the dial 9 with that as indicated on the dials of the ordinary meter-index 37, so that the amount of gas delivered in exchange for each coin inserted shall be accurately determined by a certain predetermined number of inflations and deflations of the bellows of the meter, which inflations and deflations actuate coincidently and synchronously the meter-index and the vending mechanism, neither of said two registering mechanisms deriving its motive power from the other, but each from the same common source. This construction will now be described.

In the ordinary dry gas-meter each of the flags or flag-rods (one of which is numbered 38 in Figs. 2, 4, and 23) is oscillated on its axis a certain number of times for each cubic foot of gas passed through the meter (for instance, in the construction shown, that of an ordinary "three-light" meter, nine times) with ample power. On the flag 38 may be secured an arm 39, which is horizontally oscillated with the partial rotations of the flag. To the arm 39 is connected a rod 40, which reaches into the casing 2 through a stuffing-box in the meter-casing 3 or through a flexible gas-tight diaphragm 41. The outer section 40$^a$ of the connecting-rod is supported and guided by a fixed hanger 42, (shown clearly in Figs. 2 and 9,) and said section 40$^a$ is by preference made square or angular and the opening in the said hanger of the same shape to prevent turning, and said section is provided with a pawl 43, arranged to engage with the teeth of the wheel 15 for rotating the same (in the direction of the arrow $a$, Fig. 2) the space of one tooth for each reciprocation of the connecting-rod 40 40$^a$. The wheel 15 may be provided with a pawl to prevent backward movement. This movement of the wheel 15 is communicated to the coin's-equivalent wheel 21—in this instance by the worm-shaft 44 and the gear-wheels 45 46, secured, respectively, on the shaft 44 and the shaft 14—the direction of movement of the coin's-equivalent wheel 21, as shown by the arrow $a$, Fig. 2, being the reverse of that of the reducing-wheel 15, each wheel rotating in only one direction. I do not limit myself to the use of the worm-shaft 44 and the gear-wheels 45 46, as any intermediate gearing or mechanism may be employed to transmit the required direction of movement to the coin's-equivalent wheel 21 and in so doing to count and register the number of oscillations of the flags 38; but I prefer to employ the means shown, by which I am enabled to close the valve gradually and dim the gas-jets during a long period of warning and also to conveniently change the price of gas by slipping off the wheel 21 and substituting one with a different number of teeth and by adjusting the angle of the shaft 44 so that its worm will mesh nicely with a wheel 21 of greater or less diameter, which adjustment is effected in this instance by means of the slotted yoke-plate 47 and screw 48, as will be understood clearly from Fig. 2.

Figure 13:
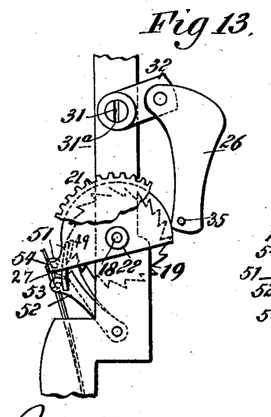
Fig. 13 is a front view of the same, showing the coin's-equivalent wheel in the act of tripping one of the escapement-pawls.

The movement of the wheel 21 carries with it the valve-closing stud 27 and also an escapement-trip 49 for operating the letting-off device or devices which temporarily hold the escapement-rack 19. The said escapement-trip 49 may be in the form of a rigid curved plate or cam-flange, as shown in Figs. 11 to 16, or it may be in the form of a curved spring-arm, as shown in Figs. 2, 7, and 9, according to the type of letting-off device or devices employed. For example, with the escapement-pallet 50 (shown in Figs. 5 and 6) I prefer to use the curved spring-arm 49. With the letting-off pawls 51 52 (shown clearly in Figs. 11 to 14) I may use the rigid curved plate or cam 49 there shown. The operation of the pallet 50 is obvious from the drawings and need not be described, its function being that of an ordinary anchor or clock escapement for releasing the escapement-rack 19 one tooth for each revolution of the wheel 21. The pawls 51 52 operate on the same side of the escapement-rack 19 and are alternately tripped by the flange or cam 49 operating first against the pin or arm 53 of the pawl 52 and then against the pin or arm 54 on the pawl 51, as shown in Fig. 13, thus releasing the escapement-rack 19 one tooth for each revolution of the wheel 21.

The cam or flange 49 may perform another function—to wit, that of automatically disconnecting the valve-arm 32 from the stud 27 after the valve has been drawn closed, as illustrated in full and dotted lines in Fig. 14. This function will, however, only be necessary if the valve should by any unforeseen mischance leak. If this should happen and gas should slip past the valve when in the closed position, its effect (in the absence of the cam 49) would be to press the stud 27 with great power against the pin 35 and to lock the two so rigidly together that when a coin was inserted the end 34 of the lever 33 could not disengage them. With the cam 49, however, the effect of a leakage past the valve would be that the wheel 21 would be very slowly rotated, that the cam 49 would push the pin 35 out of its path, (assuming successively the positions shown in full and dotted lines, respectively, in Fig. 14,) and the wheel 21 would begin an unpaid-for rotation. The amount of gas passed would be too small to satisfy a consumer, so that when in the natural course of events the consumer desires a new supply of gas and inserts a coin the equivalent in gas of that coin has the amount of leakage—i. e., the unpaid-for portion of the rotation of the wheel 21—deducted therefrom—that is to say, the first coin inserted purchases only the balance or remainder of one full revolution of the wheel 21. If it be preferred not to employ the flange 49, the impingement of 27 against 35 will lock the meter and prevent the passage of gas therethrough, and while I have shown and claimed the rotating stud 27 engaging directly with the valve-gear I do not wish to be understood as limiting myself to the precise form of construction and number of parts shown in the valve-gear, as these may be variously changed within the scope and spirit of my invention.

Figure 5:
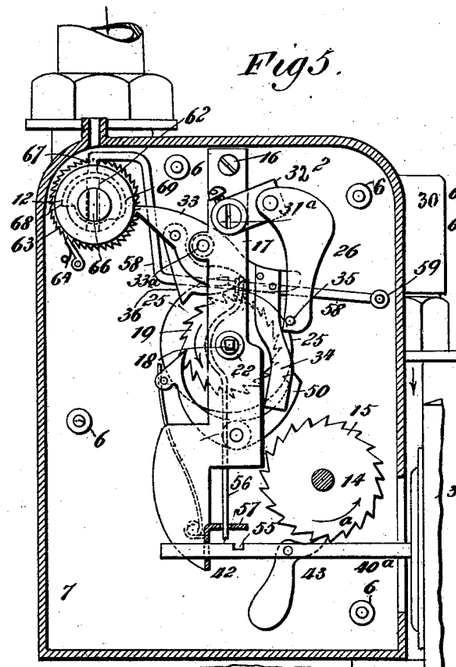
Fig. 5 shows the mechanism of the coin-controlled machine, the coin's-equivalent wheel and its parts being removed, the parts shown being in the same position as in Fig. 2.

55, Figs. 2, 5, and 6, represents a notch or latch formed in the section 40ª of the connecting-rod and adapted to receive the lower end of the locking-plate 56. (Shown in Figs. 2, 5, 6, and 9.) The lower end of this plate is held in a guide 57 and its upper end is attached to a rod 58, one end of which is pivoted on or attached to the small shaft 59 and the opposite end of which is adapted to be reciprocated by the operation of the coin-carrier 12 for engaging the locking-plate 56 with and disengaging it from the latch 55, the object being to lock the meter from the time or shortly after the coin is inserted in the coin-carrier until the coin is finally discharged therefrom into the bottom of the casing or into a till there placed to receive it. By this means if the purchaser should fraudulently attempt to hold or fasten the handle 60 of the coin-carrier in the position of purchase (that of opening the valve) the plate 56 will operate to lock the meter and prevent the passage of gas, (see Fig. 6;) but in order that this locking may not happen if the handle should accidentally and without being forcibly detained be left in this valve-opening position I may counterweight the handle, as shown at 60ª in Fig. 9, so placing the weighted handle that if the coin-carrier should be accidentally left in the position shown in Fig. 6 the weight would be at the full radial distance of the handle from the vertical of its center of gravity and would by gravity complete the rotation of the carrier and discharge the coin; or I may provide the front end of the coin-carrier with a crank and spring and the rear end of the shaft of the handle with a complementary crank or off-center projection and place the spring so that if the coin-carrier should be left at the position shown in Fig. 6 the handle could not be used to detain it and the spring would complete the rotation of the coin-carrier, as more fully described in Letters Patent No. 577,215, granted to me February 16, 1897.

Figure 10:
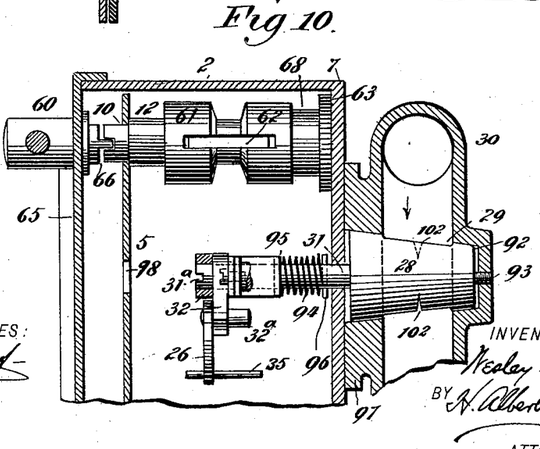
Fig. 10 is a detailed sectional plan view on the line $y\ y$ of Fig. 3.
Figure 18:
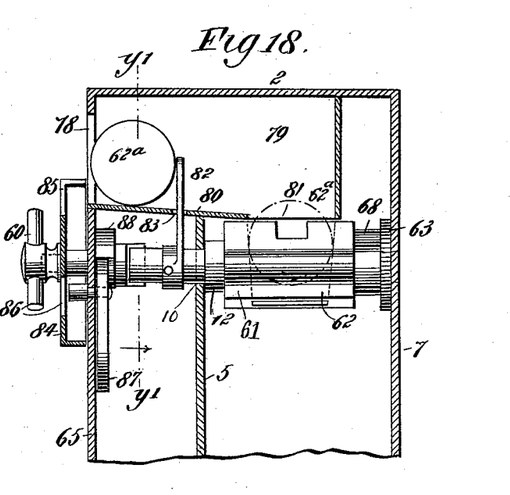
Figure 19:
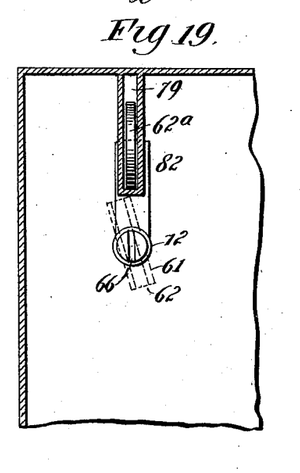
Figure 21:
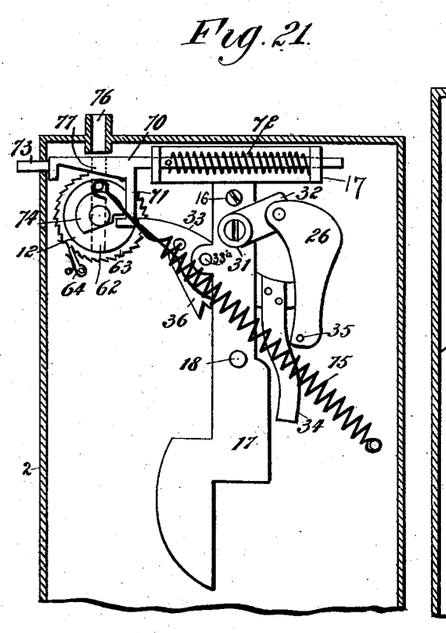
Fig. 21 is a detailed elevation showing in particular another modification of the mechanism for preventing fraudulent use of the machine and for preventing the improper introduction of coins and the improper operation of the coin-carrier.

The coin-carrier which I prefer to use consists of a rotating block, cylinder, or barrel 61, having a coin slot or recess 62 formed therein, shown clearly in Fig. 10, and adapted to receive and hold a coin 62ª proper to the machine, so that the edge thereof may protrude sufficiently to depress the lever 33, as illustrated in Fig. 6, or the coin-carrier of Figs. 10 and 21 may be in the form of a flat pivoted or rotating coin-retaining frame or pocket, as shown in Figs. 18 and 19. Backward movement of the coin-carrier is prevented by a ratchet 63 and pawl 64. The front end of the coin-carrier is journaled in the skeleton plate 5. The knob or handle 60 is journaled in alinement with the coin-carrier in the front plate or door 65 and is separable from the coin-carrier, so that the said door or front plate may be opened or removed. A tongue-and-groove connection 66 is preferred for operatively connecting the handle or knob with the coin-carrier, which connection is effected in closing the door or putting on the front plate. In the same vertical plane with the upper hooked end 67 of the arm 58 the coin-carrier is formed with a cam 68, (see Figs. 5 and 6,) the edge of least eccentricity of which permits the locking-plate 56 to drop into the latch 55 and thus lock the meter by stopping the flag-arm. The meter will be locked until the greater eccentricity 69 of the cam in the rotation of the coin-carrier lifts the end 67 of the lever 58, whereupon the meter will be released.

An alternative form to prevent fraudulent holding of the valve open is shown in Fig. 21, wherein the latch 55, locking-plate 56, and lever 58 are dispensed with. In this form of construction, (which also prevents clogging of the machine by the improper insertion of coins,) 70 represents a slotted locking-plate formed with a hooked arm 71. The said plate slides in alined bearings or openings in the upper part of the bridge 17 and is urged outward by a spring 72, and the outer end of said plate projects through and outside of the casing to form a knob or push-button 73, by which the purchaser may push back the plate 70 and cause the arm 71 to release the coin-carrier by clearing the cam 74 thereof, whereupon the coin-carrier is rotated solely by a spring 75 a portion of a revolution sufficient to carry the coin to depress and pass the lever 33. The construction of the coin-carrier, its connection with the knob or handle 60, and the action of the spring 75 are illustrated and described in Letters Patent No. 577,215, granted to me February 16, 1897, and need not be here again described. That portion of the plate 70 between the arm 71 and push-button 73 overlies the coin-carrier 12 and operates between it and an external coin-slot 76 and is itself formed with a slot 77 for the passage of the coins. This latter slot is so placed that when the coin-carrier is locked by the arm 71 the said slot alines with the external slot 76 and the slot or recess 62 in the coin-carrier. At all other times or positions a solid portion of the plate prevents the introduction of a coin. Hence a coin cannot be inserted except when the coin-carrier is in the proper position to receive it, and two or more coins cannot be inserted in succession without rotating the coin-carrier after the insertion of each coin.

Figure 17:
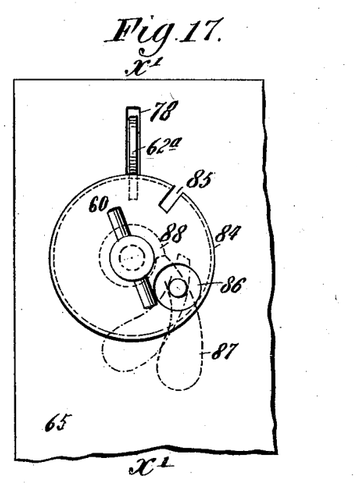
Fig. 17 is a front view, Fig. 18 a transverse sectional elevation on the line $x'\ x'$ of Fig. 17, and Fig. 19 a front sectional elevation on the line $y'\ y'$ of Fig. 18, showing in detail a modified form of the coin-slot and coin-carrier, with a portion of the casing and one form of mechanism for preventing the improper introduction of coins and the improper operation of the coin-carrier.

In Figs. 17, 18, and 19 I have shown an external coin-slot 78 in the front of the casing and another means for obviating the danger of clogging the machine by introducing several coins in succession without operating the machine by the required rotation of the coin-carrier after each insertion. This means consists of an upper coin chute or chamber 79, formed in the casing immediately above the coin-carrier 12. The bottom 80 of this coin chute or chamber is inclined from the external slot 78 to the horizontal slot 81, so that the coin, when permitted to do so, will roll or slide by gravity into position to drop through the slot 81 into the coin-carrier, as illustrated in dotted lines in Fig. 18. After the coin has been inserted into the outer coin-slot 78 it is temporarily held at the front of the chamber 79, as illustrated in full lines in Fig. 18, by a coin-detaining plate 82, fixed to the shaft of the coin-carrier, so as to be rotated therewith. This plate sweeps transversely through a slot 83, formed in the walls and bottom of the chute or chamber 79.

The knob or handle 60 is provided with a disk 84, in which is formed a radial slot 85 and an aperture 86, which latter is to enable the purchaser, by the insertion of his thumb or finger through said aperture, to disengage the pawl 87 from the locking stud or cam 88, formed on the shaft of the knob or handle behind the front plate of the casing. The said radial slot is formed at a point in the disk 84 so placed that in the revolution of the disk with the knob or handle it alines with the main coin-slot 78 before the projection of the cam 88 engages with the pawl 87. At all other points the disk closes a portion of the main coin-slot 78 and prevents the insertion of a coin therein. The detaining-plate 82 is in line with the radial slot 85, and consequently stands across the chute or chamber 79 whenever the slot 85 permits access to the slot 78, and hence prevents the introduction of more than a single coin for the reason that in order to pass into the coin-carrier a coin already introduced the purchaser must first partially turn the knob or handle and disk (and thereby close slot 78) to enable him to disclose the pawl 87 through the aperture 86 and to move it back with his finger, without which disengagement the handle, coin-carrier, and plate 82 could not be revolved. Hence but one coin at a time can be introduced into the chute 79, and then only when the coin-carrier 61 and slot 62 are in the proper position to receive it, and before a second coin can be introduced the coin in the carrier must be rotated, must depress the lever 33, and must be discharged into the till.

Figure 22:
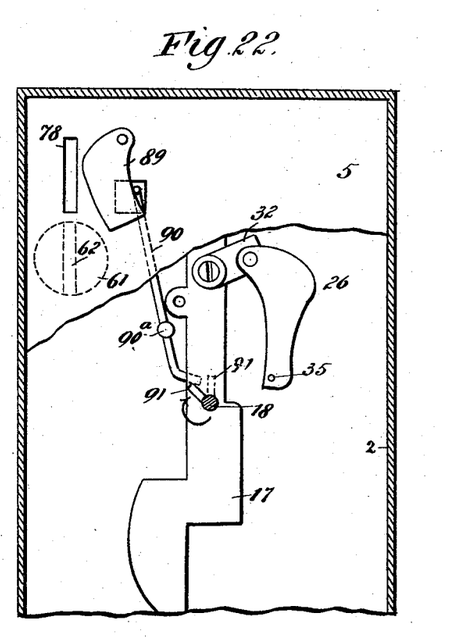
Fig. 22 shows in diagram a slot-closing device preventing the introduction at one time of more than the number of coins which the machine is adapted to receive at one time.

In Fig. 22 I have illustrated in diagram a device for closing the external coin-slot when the full number of coins which the machine is constructed to receive has been introduced. This consists of a swinging plate or shutter 89, pivoted adjacent to the coin-slot, a lever 90, pivoted at $90^a$, and a radial projection 91, carried by the shaft 18. At zero—i. e., when the valve is closed—the projection 91 would stand in the position shown in dotted lines. For each coin inserted the projection 91 will move with the escapement-rack one tooth in the direction of the arrow till on the introduction of the next to the last coin the machine is constructed to receive it will stand in the position shown in full lines, and with the introduction of the last coin it will impinge from below against the under side of the lower end of the lever 90 and cause its upper end to swing the shutter 89 across the coin-slot. With the consumption of the first coin's purchase of gas projection 91 will move back with the escapement-rack in the direction opposite to that indicated by the arrow, and the lever 90 and shutter 89 will swing to their original position.

The valve which I prefer to use is shown in detail in Fig. 10. The union or coupling 30 is formed with a lateral recess 92 to receive the outer or rear end of the cock or plug 28. Said plug is seated in the said recess 92 against a stud 93, the latter being, by preference, screw-threaded, entering a tap made in the central portion of the recess 92. The plug 28 and its seat 29, including that portion thereof in the recess 92, are in the form of a frustum of a cone. The stem 31 is provided with a spring 94, which acts between a fixed bearing or abutment 95 and a pin or collar 96 in or upon the said stem. In assembling the valve the plug 28 is ground to a perfect seat in 29 before the stud 93 is put in place. The taper of the plug and seat in the operation of the valve constantly tends to move the plug in the direction of its smaller end, and thus to make the plug stick or wedge fast or to cause the plug to turn with much more difficulty than a practically gas-tight fit would require. The plug having been turned or ground into the seat, as stated, to the point of sticking, I screw in the stud 93 so far that its inner end impinges against the end of the plug and raises it or moves it a trifle in the seat until an accurate adjustment of the plug is reached— i. e., so that the plug, while making a perfectly reliable gas-tight cut-off, can at the same time be turned with sufficient ease for the purposes required—i. e., to be turned open by the coin and to be turned shut by the power of the meter. By this method it will be seen that the pressure or inward thrust of the spring 94 will produce and constantly maintain a friction contact between the plug 28 and the stud 93 and between the plug 28 and its seat 29, and that any wear between the surface of the plug and the surface of the seat will be compensated for by the wear between the plug 28 and the stud 93, both of which wears will be constantly and automatically taken up by the pressure of the spring and the gas-tightness and easy action therefore constantly maintained. Experiment shows that a valve of this construction, while being perfectly gas-tight, is liable to turn too easily, so easily that the arm 32 and the pendant 26 may sometimes close it of their own weight, and therefore the spring 94 serves the additional function of a brake or drag to hold the plug against the gravity of 32 and 26 and to prevent the gas from being cut off except by the action of the meter. The screw-stud 93, after the valve is completed, will be faced off flush with the coupling, so that it cannot be tampered with, and the coupling 30 is formed with a face 97, which fits flat against the back of the casing and is there secured from within the casing, as shown clearly in Figs. 10 and 20, and thus not only incloses the valve and prevents it from being tampered with, but effects a perfect alinement of the stem 31 in the casing, or, in other words, squares the axis of the plug perfectly at right angles with the back plate 7 of the casing 2, so that the valve cannot bind. The end of the valve-stem 31 may, if desired, be formed with a slot $31^a$, like the slot in the head of a screw, or may be squared, so as to form a keypost, so that by inserting a suitable screwdriver or key through an aperture 98 in the skeleton plate 5, as shown in Fig. 10, or dial-plate 9, or both, where they overlap, as shown in Fig. 1, the collector may conveniently test the working condition of the valve.

Figure 20:
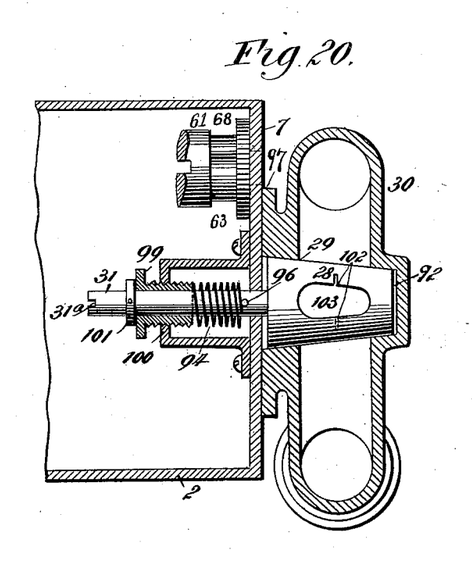
Fig. 20 is a detailed plan view of a modified form of the cock or valve.

In the modification shown in Fig. 20 in place of the stud 93 I employ a screw-threaded gland 99, which works in cap-plate 100, the outer end or head of the gland operating against a flange or collar 101, pinned to the stem 31, the spring 94 operating between the inner end of the gland and the pin 96.

In the construction shown in the drawings each tooth on the coin's-equivalent wheel 21 represents five cubic feet of gas, and the operation of turning the valve from full on to full off (i. e., from the position shown in Fig. 5 to that shown in Fig. 7) will require the passage through the meter of from ten to twenty-five cubic feet of gas, but where a construction is employed in which each tooth of the wheel 21 represents but one foot of gas it may be desirable to prolong the warning period during which the gas-jets are "dimmed" or turned low, and for this purpose I may form a narrow race 102, Figs. 10 and 20, in diagonally opposite edges of the main passage 103 through the plug 28, so that after the large main passage is closed a small flow of gas is allowed to pass through the small passage afforded by the diagonally opposite races till in the now retarded further rotation of the plug they in their turn are completely closed and the gas is entirely cut off.

Figure 23:
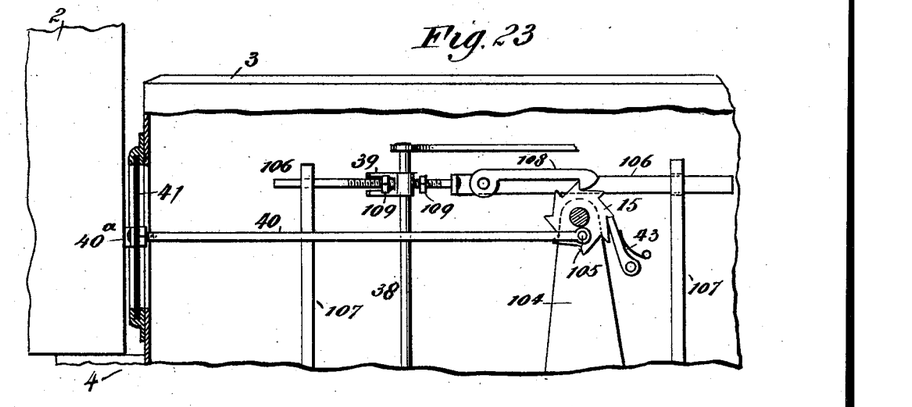
Fig. 23 shows in front elevation a modification wherein the reducing-wheel is located in the attic or gallery of the meter instead of being placed within the casing of the coin-controlled apparatus, as in the other figures.

Referring now to Fig. 23, I have here shown a modification wherein the reducing-wheel 15 of Figs. 2, 5, and 7 is located in the gallery or attic of the meter without taking the power from any part of the meter mechanism, which is driven directly or indirectly by the ordinary meter-worm on the king-post, which in the usual construction of ordinary meters, being intended to perform no other labor than to actuate the index, is made of soft metal. In this form of construction the axle of the reducing-wheel $15^a$ is journaled in uprights 104 and a crank or wrist pin 105 reciprocates the connecting-rod 40. The wheel is intermittently rotated by the arm 39 on the flag 38 through the medium of a reciprocating pawl-carrier 106, held in a pair of guides 107 and provided with a pivoted pawl 108. There being, as here shown, nine teeth on the wheel $15^a$, and each oscillation of the flag representing one-ninth of a foot of gas, each reciprocation of the connecting-rod 40 represents the passage of one cubic foot of gas through the meter. The rod 40 is connected to and reciprocates the rod $40^a$, which in its turn, by means of a weighted or spring-impelled pawl, like pawl 43 in Fig. 2, rotates tooth by tooth, one tooth for each reciprocation, the wheel 21, which in this form of construction would have ratchet-teeth instead of gear-teeth, every tooth of the wheel 21 representing one cubic foot of gas, and wheel 15, gear-wheels 45 46, and worm-shaft 44 of Fig. 2 being dispensed with. If it be desired to have each tooth on the wheel 21 represent a given number of cubic feet of gas passed through the meter, the desired reduction can be obtained either by multiplying the number of teeth on wheel $15^a$ of Fig. 23 or by combining the construction shown in Fig. 23 with that shown in Fig. 2 and allowing the rod 40 and $40^a$ to rotate the wheel 15 (every tooth of which would then represent one foot of gas) and (through gears 45 and 46 and worm 44) the coin's-equivalent wheel 21.

Figures 3, 4:
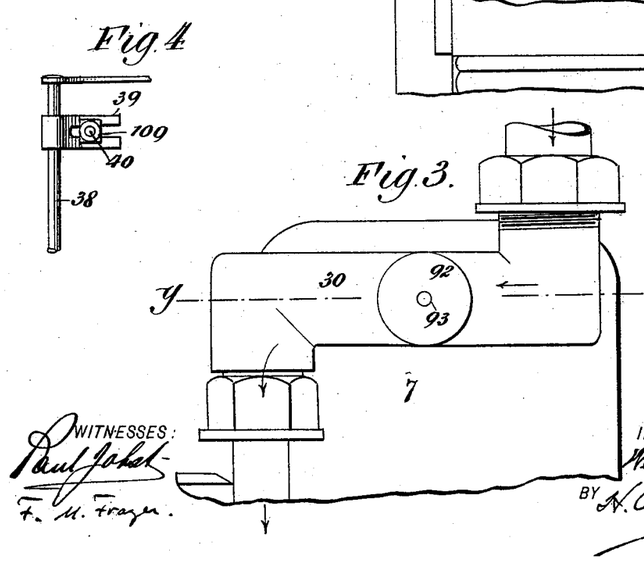
Fig. 3 is a detailed rear elevation showing the pipe connections, the coupling, and the location of the valve or turn-cock.
Fig. 4 is a detailed side elevation of the flag and its connections shown foreshortened in perspective in Fig. 2.

109 109, Figs. 2, 4, and 23, represent jam-nuts located one each side of the arm 39 on screw-threaded portions of the connecting-rod 40 or of the pawl-carrier 106 for adjusting the amount of reciprocation to be imparted to the rod 40 40ᵃ (or pawl-carrier 106, as the case may be) at each sweep of the arm 39 to carry the pawl 43 or the pawl 108 a distance greater than one tooth and less than two teeth on the wheel 15 or the wheel 15ᵃ.

Having thus described my invention, what I claim as new, and desire to secure by Letters Patent, is—

1. In a coin-controlled gas-vending machine, an escapement-rack, means operated by the insertion of a coin for winding up the rack one tooth for each coin inserted, means operated by the meter mechanism for letting the rack back one tooth for each coin's equivalent in gas passed through the meter, a valve fitted in the gas-pipe, means operated by the meter mechanism for closing the valve, and means operated by the insertion of a coin for disconnecting the valve from the valve-closing mechanism; substantially as described.

2. In a coin-controlled gas-vending machine, a valve fitted in the gas-passage, a lug or projection rotated by the power of the meter mechanism and directly engaging the valve-gear for closing the valve, and a lever arranged to be operated by the insertion of a coin for opening said valve; substantially as described.

3. In a coin-controlled gas-vending machine, a valve fitted in the gas-passage, an arm or lever connected to the stem of the valve, a valve-closing link connected to said arm, an escapement-rack, a valve-closing stud or projection operated by the power of the meter mechanism, and means operated by the insertion of a coin for disconnecting the valve-closing link from the valve-closing stud and for simultaneously winding up the escapement-rack; substantially as described.

4. In a coin-controlled gas-vending machine, the combination with an escapement-rack, a valve fitted in the gas-passage, a coin-carrier, and a rotatory stud arranged to engage with a link for closing the valve, of a lever 33 having an arm 34 and provided with a pawl 36 for setting back or winding up the escapement-rack, the said arm and lever being arranged to disconnect the valve from the said stud and to open the valve; substantially as described.

5. In a coin-controlled gas-vending machine, a valve fitted in the gas-pipe and provided with an arm and link, an escapement-rack, a rotatory stud for engaging with said link for closing the valve, means for disconnecting said link from said stud, and an eccentric or cam for holding said link out of the path of said valve-closing stud till the consumption of the last coin's equivalent in gas is in progress; substantially as described.

6. In a coin-controlled gas-vending machine, a valve fitted in the gas-passage and provided with an arm and link for closing the valve, in combination with a rotatory projection or stud for closing the valve, and a flange adjacent to and rotating with said stud for disconnecting it from the valve-closing link; substantially as described.

7. In a coin-controlled gas-vending machine, a rotatory apertured valve-plug in a seat, the plug being formed with passages, races, or slots on the diagonally opposite edges of the aperture of said plug; substantially as described.

8. In a coin-controlled gas-vending machine, a rotatory coin-carrier formed with an eccentric or cam, and a reciprocating power-transmitting rod operated by the meter, in combination with a locking plate or bolt adapted to engage with the said rod and lock the same at the time the coin-carrier is in position to open the gas-valve, and held out of engagement with the said rod at other positions of the coin-carrier; substantially as described.

9. In a coin-controlled gas-vending machine, in combination with a gas-meter, a toothed wheel intermittently rotated by a pawl connected to a rod reciprocated by an arm attached to the flag of the meter; substantially as described.

10. In a coin-controlled gas-vending machine, a toothed reducing-wheel rotated in only one direction by the mechanism of the meter, a coin's-equivalent wheel rotated by means rotated by the said reducing-wheel said coin's-equivalent wheel being provided with means for releasing at each rotation an escapement-rack one tooth or notch; substantially as described.

11. In a coin-controlled gas-vending machine, an escapement-rack secured to a shaft which reaches to the front of the dial-plate, combined with a coin's-equivalent wheel journaled on said shaft and provided with a sleeve which also reaches to the front of the dial-plate, said shaft and sleeve being each provided with a pointer, means operated by the insertion of a coin for rotating said escapement-rack in one direction, and means operated by the meter mechanism for rotating said coin's-equivalent wheel in one direction and for setting back the said escapement-rack; substantially as described.

12. In a coin-controlled gas-vending machine, an inclosing casing formed with a coin-slot, a rotatory coin-carrier having a slot or recess formed therein adapted to receive a coin from said slot, a spring-pressed slotted plate interposed between said slot and said coin-carrier, and a cam formed on or arranged to rotate with said coin-carrier and arranged to reciprocate said plate so as to alternately aline and throw out of alinement the slot in the casing, the slot in the plate and the slot or recess in the coin-carrier; substantially as described.

WESLEY WEBBER.

Witnesses:
LEWIS S. BURCHARD,
H. ALBERTUS WEST.